G. R. STRINGHAM.
MOTION PICTURE CAMERA.
APPLICATION FILED DEC. 12, 1917.
1,350,683.
Patented Aug. 24, 1920.
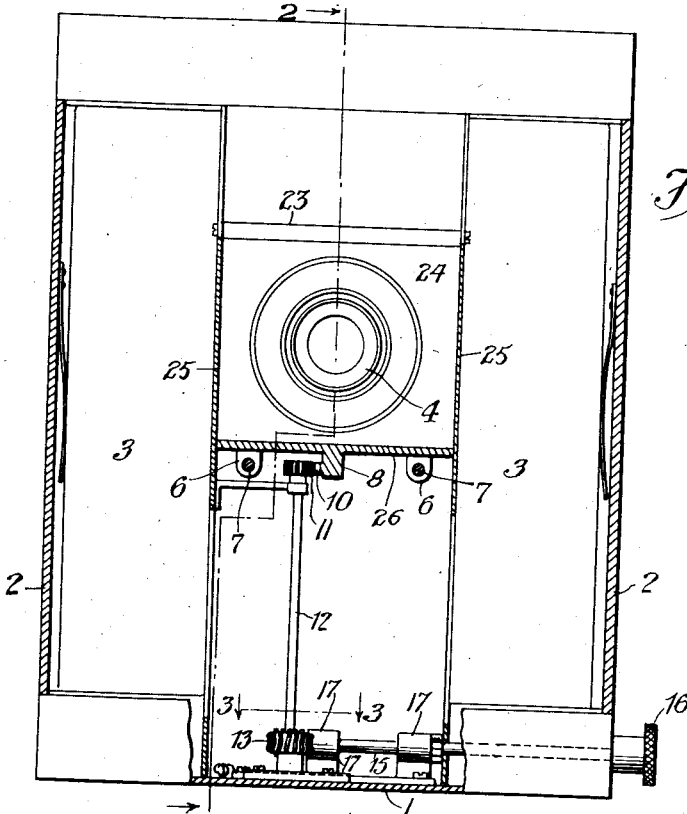
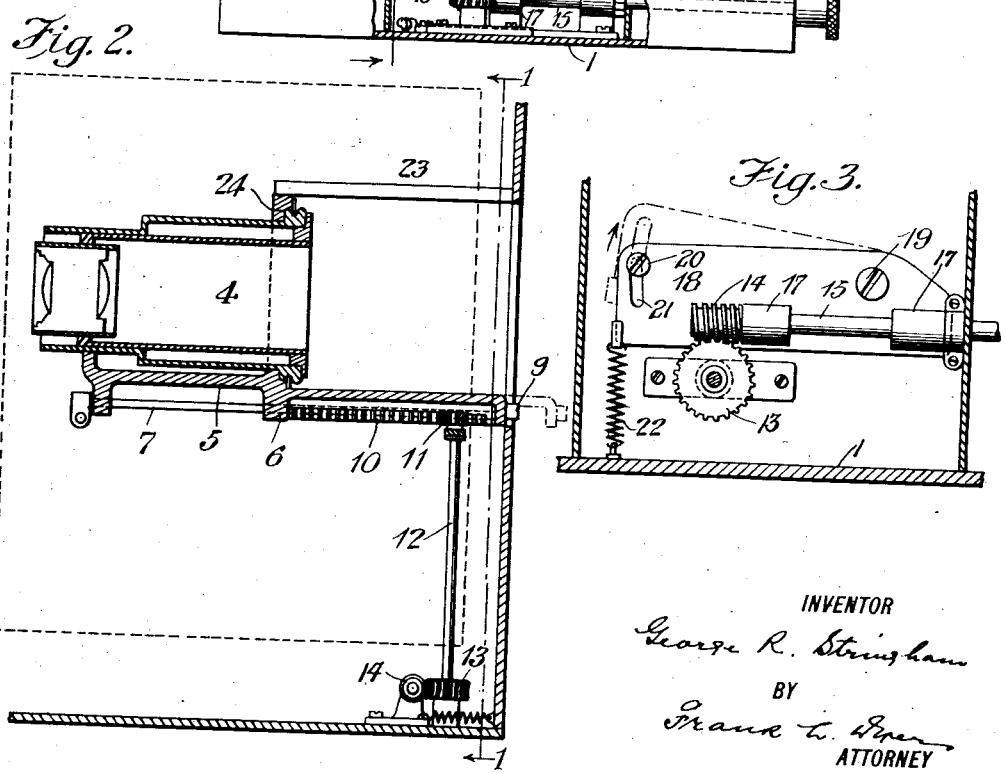
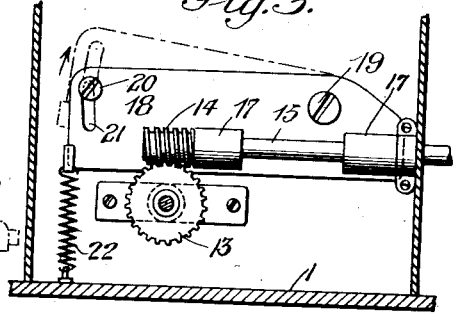
INVENTOR
George R. Stringham
BY
Frank L. Dyer
ATTORNEY

UNITED STATES PATENT OFFICE.

GEORGE R. STRINGHAM, OF NEW YORK, N. Y., ASSIGNOR, BY MESNE ASSIGNMENTS, TO MARTIN V. KELLEY, TRUSTEE, OF NEW YORK, N. Y.

MOTION-PICTURE CAMERA.

1,350,683.   Specification of Letters Patent.   Patented Aug. 24, 1920.

Application filed December 12, 1917. Serial No. 206,764.

*To all whom it may concern:*

Be it known that I, GEORGE R. STRINGHAM, a citizen of the United States, and a resident of the borough of Manhattan, city, county, and State of New York, and having a post-office address at No. 512 West 132nd street, New York, have invented certain new and useful Improvements in Motion-Picture Cameras, of which the following is a specification.

My invention relates to various new and useful improvements in motion picture cameras and particularly to the arrangement of the lens with respect to the film magazine, to the mechanism for focusing the lens and to a new arrangement by which the lens tube may be entirely removed if a new lens requires to be substituted. In general, I construct a camera in which the film boxes are arranged side by side with a space between them and in this space I mount the lens. The film feeding devices, which may be of any suitable type, are arranged in the camera case behind the film boxes and present a section of the film in line with the lens, movable intermittently past the lens opening, and on which the image will be focused, any desired shutter being employed to cut off the light during the periods of movement as will be understood by those skilled in the art. With my improved camera the lens tube is mounted some distance within the camera case, thus enabling me to use a short focus lens. At the same time the lens tube being thus located within the camera case I automatically provide a light hood for the same by which it will be protected from strong rays when the camera is used out of doors. A further advantage of mounting the lens tube entirely within the camera case is to protect the lens tube from accidental injury, while at the same time the camera as a whole is more compact and convenient than it would be if the lens tube were mounted on the front of the camera case as heretofore suggested. The lens tube is mounted within the camera case on suitable guides and is capable of being moved back and forth by a focusing mechanism which permits a very accurate focusing operation to be performed, while at the same time the mechanism is strong and sturdy in construction. This focusing mechanism is so arranged as to permit the lens tube to be temporarily freed, thus allowing the lens tube to be drawn out by the operator from its normal position within the camera case and a new lens tube substituted when necessary. In order that my invention may be better understood, attention is directed to the accompanying drawing forming a part of this specification, and in which—

Figure 1 is a cross section view on the line 1—1 of Fig. 2, through a motion picture camera embodying my present improvements.

Fig. 2 a vertical section on the line 2—2 of Fig. 1, and

Fig. 3 a section on the line 3—3 of Fig. 1, particularly illustrating the mechanism for releasing the lens tube and permitting the same to be withdrawn.

In the above views corresponding parts are represented by the same reference numerals.

The camera case 1 is generally rectangular and is provided with hinged side doors 2, 2, which may be swung open to permit the film boxes 3, 3, to be placed in position. These film boxes, as will be seen, are located side by side within the camera with a space between them. Within this space is located not only the lens tube, as I will explain, but also most of the mechanism of the camera by which the film is fed, the shutter operated and any other desired functions performed. For the purposes of the present invention any suitable mechanism may be employed for feeding the film and for operating the shutter. As will be understood the film loops will be located in the rear of the camera case and a section of the film will be fed intermittently past the lens tube so as to be exposed by the shutter during the periods of rest. These film feeding and shutter mechanisms are so well known in the art that specific illustration thereof is not necessary in connection with my present invention which relates to the location of the lens tube with respect to the film boxes and the mechanism for operating the lens tube. The lens tube 4 is of any suitable construction. It is movably supported by a carriage 5, having lugs 6, 6, which slide on guides 7. The carriage 5 is provided with a central forwardly extending rib 8 having a finger piece 9 at its outer end which may be grasped by the operator when the carriage is freed, thus permitting the carriage to be drawn out and the lens tube to be removed. As a part of the carriage below the rib 8 is a rack 10 with which a spur wheel 11 engages. Said spur wheel is mounted on a shaft 12 arranged vertically in suitable bearings behind the front wall of the camera casing and carrying a worm gear 13 near its lower end. Meshing with the latter is a worm 14 on the end of the shaft 15 extending through one of the side walls of the camera casing near its bottom and having a thumb wheel 16 at its outer end by which the shaft may be rotated. The bearings 17 for the shaft 15 are carried by a plate 18 which is pivoted to the screw 19. Another screw 20, working in a slot 21, permits the plate to be moved pivotally and at the same time serves to rigidly maintain the plate in contact with the inner bottom face of the camera casing. A spring 22 normally maintains the plate 18 in the position shown in Fig. 3 with the worm 14 in mesh with the worm gear 13. A plate 23 fixed within the camera casing acts as the top of the light well in which the lens tube is located, and sliding in contact with this top plate is a flexible diaphragm 24, made preferably of felt, carried by the lens tube, so as to form a light tight joint. The sides of the light well are formed by the plates 25, with which the diaphragm engages, and the bottom of the light well is formed by the plate 26 which is carried by and constitutes a part of the carriage 5 and with which the rib or arm 8 is integrally cast. By thus mounting the lens tube in a light well, it may be moved freely back and forth in focusing, while fugitive light rays are effectively excluded from the interior of the camera. In operation, the lens tube is focused by turning the thumb wheel 16, thus rotating the worm 13 and giving a very slow but positive movement to the rack 10 in either direction. When it is desired to remove the lens tube, the thumb wheel 16 is swung to one side (the side of the camera casing being slightly slotted for this purpose), thus swinging the plate 18 and disengaging the worm 14 from the worm gear 13. This frees the carriage 5 and by means of the finger piece 9 it may then be drawn forwardly so as to disclose the lens tube and permit the latter to be removed from the carriage and a new lens tube substituted.

Having now described my invention what I claim as new therein and desire to secure by Letters Patent is as follows:

1. In a motion picture camera, the combination with a camera casing and two film boxes mounted therein side by side with a central space between them, of a lens tube mounted between said film boxes entirely within the camera casing, substantially as set forth.

2. In a motion picture camera, the combination with a camera casing and two film boxes mounted therein side by side with a central space between them, of a lens tube mounted between said film boxes entirely within the camera casing, and a short focus lens in said lens tube, substantially as set forth.

3. In a motion picture camera, the combination with a camera casing, and two film boxes mounted therein side by side with a central space between them, said space being walled to form a light well, of a lens tube mounted in said light well entirely within the camera casing, substantially as set forth.

4. In a motion picture camera, the combination with a camera casing and two film boxes mounted therein side by side with a central space between them, said space being walled to form a light well, of a lens tube mounted in said light well entirely within the camera casing and a diaphragm carried with the lens tube and making a light tight sliding contact with the stationary walls of the light well, substantially as set forth.

5. In a motion picture camera, the combination with a camera casing and two film boxes mounted therein side by side with a central space between them, of a lens tube mounted between said film boxes entirely within the camera casing, means for focusing the lens tube and means for disabling the focusing means to permit the lens tube to be drawn out of the camera casing, substantially as set forth.

6. In a motion picture camera, the combination with a lens tube and lens, of a rack carried thereby, a pinion engaging said rack, a worm gear connected with said pinion, a worm engaging said worm gear, and means permitting the disengagement of said worm and worm gear to release the lens tube, substantially as set forth.

7. In a motion picture camera, the combination with a lens tube and lens, of a rack carried thereby, a pinion engaging said rack, a worm gear connected with said pinion, and a worm gear engaging said worm and mounted so as to swing pivotally into and out of such engagement, substantially as set forth.

8. In a motion picture camera, the combination with a lens tube and lens, of a rack carried thereby, a pinion engaging said rack, a worm gear connected with said pinion, a pivoted plate, a shaft mounted on said plate and a worm carried by said shaft and movable, by the swinging of said plate, into and out of engagement with said worm gear, substantially as set forth.

This specification signed and witnessed this 30th day of October, 1917.

GEORGE R. STRINGHAM.

Witnesses:
A. E. RENTON,
JOSEPHINE G. MCDERMOTT.